United States Patent [19]

Michaluk

[11] Patent Number: 5,478,484
[45] Date of Patent: Dec. 26, 1995

[54] APPARATUS AND METHOD INCLUDING A HYDROCYCLONE SEPARATOR IN COMBINATION WITH A TUBULAR FILTER

[75] Inventor: Peter G. Michaluk, Gloucester, United Kingdom

[73] Assignee: Serck Baker Limited, Dorset, United Kingdom

[21] Appl. No.: 185,826

[22] PCT Filed: Jul. 22, 1992

[86] PCT No.: PCT/GB92/01343

§ 371 Date: Apr. 29, 1994

§ 102(e) Date: Apr. 29, 1994

[87] PCT Pub. No.: WO93/01877

PCT Pub. Date: Feb. 4, 1993

[30] Foreign Application Priority Data

Jul. 25, 1991 [GB] United Kingdom ............... 9116020

[51] Int. Cl.$^6$ ............... B01D 21/36; B01D 26/00
[52] U.S. Cl. ............... 210/788; 210/295; 210/299; 210/313; 210/333.01; 210/335; 210/512.1; 210/304; 210/787; 55/337; 55/459.1; 209/719; 209/721; 209/727; 209/732
[58] Field of Search ............... 210/295.299, 304, 210/312, 313, 333.01, 335, 512.1, 787, 788; 55/337, 459.1; 209/719, 721, 727, 732

[56] References Cited

U.S. PATENT DOCUMENTS

| | | |
|---|---|---|
| 2,026,834 | 1/1936 | Holly . |
| 3,637,079 | 1/1972 | Strub .................. 210/333.01 |
| 4,274,968 | 6/1981 | Grutsch et al. ............ 210/512.1 |
| 5,112,479 | 5/1992 | Srimongkolkul ............ 210/512.1 |

FOREIGN PATENT DOCUMENTS

| | | |
|---|---|---|
| 0158529 | 10/1985 | European Pat. Off. . |
| 0385260 | 9/1990 | European Pat. Off. . |
| 2065223 | 5/1973 | Germany . |
| 323719 | 1/1930 | United Kingdom . |
| 737457 | 9/1955 | United Kingdom . |
| 935041 | 8/1963 | United Kingdom . |
| 1366453 | 9/1974 | United Kingdom . |
| 1375210 | 11/1974 | United Kingdom . |
| 2166068 | 4/1986 | United Kingdom . |

Primary Examiner—Robert A. Dawson
Assistant Examiner—David Reifsnyder
Attorney, Agent, or Firm—Nixon & Vanderhye

[57] ABSTRACT

A separator comprises a cyclone for removing more dense particles e.g. sand and a filter for removing less dense particles e.g. organic material from a liquid e.g. water. The arrangement is such that the filter experiences a shearing/scouring force which assists in preventing blockage.

15 Claims, 3 Drawing Sheets

5,478,484

APPARATUS AND METHOD INCLUDING A HYDROCYCLONE SEPARATOR IN COMBINATION WITH A TUBULAR FILTER

BACKGROUND OF THE INVENTION

1. Field of the Invention

This invention relates to a separator for separating solid particles from water or other liquids.

2. Discussion of Prior Art

Hydrocyclone separators are well known for the separation of solids from a liquid such as water utilising centrifugal force to facilitate this separation on the basis of solid size and density. Efficient separation may be accomplished down to very small sizes eg. less than 5 micron with relatively dense solids eg. sand having a specific gravity of about 2.5. However the separation efficiency is reduced when hydrocyclone separators are used for separating solid particles having specific gravity less than 2.5. Thus for example, hydrocyclone separators may be used on oil production platforms to separate sand, scale and corrosion products from produced water effectively, but cannot be used as effectively for separating small organic matter and plankton from sea water. To separate such solids from sea water it is current practice to use mechanical strainers or filters consisting of mesh or slotted elements. Separated solid particles are backwashed from the elements periodically but during severe high solids loading (eg. in planktonic bloom conditions) the strainers or filters may need to be continuously backwashed. Elements used in such conditions are found to be difficult to clean because they need very high local backwashing velocities.

It is an object of the present invention to provide a separator which does not suffer from the above disadvantages.

SUMMARY OF THE INVENTION

In accordance with the invention there is provided a separator for separating solid particles from a liquid comprising a tapered tube having a wide end and a narrow end, a tangential inlet at the wide end of the tube for feeding the liquid and particle mixture tangentially into the tube at sufficiently high velocity to cause the mixture to rotate and thereby form a vortex, an outlet at the narrow end of the tube for the removal of at least some of the solid particles, an outlet at the wide end of the tube for the removal of the liquid and the remaining solid particles, a housing having a tubular filter located therein and an exit, the filter being mounted coaxially with the tube at the wide end thereof, the outlet at the wide end of the tube comprising a cylindrical vortex finder provided coaxially with the tube for guiding liquid and remaining solid particles from the tapered tube to the filter, the housing exit being positioned to allow liquid which has passed through and been filtered by the filter to pass out of the housing, characterised in that the housing is provided with a further outlet which is operable to cause some liquid and remaining solid particles to pass axially and rotationally across the surface of the filter to detach trapped solid matter and then out of the housing through said further outlet.

The vortex finder may be constructed and arranged to guide liquid and remaining solid particles to either the interior or exterior of the filter, liquid then passing either outwards or inwards respectively through the filter to remove the remaining solid particles.

Preferably a chamber is provided in the vicinity of the outlet at the narrow end of the tube for collecting solid particles.

Preferably backwash means are provided for the tubular filter operable as required to remove solid particles trapped thereby. The backwash means may comprise an accumulator.

In accordance with another aspect of the invention there is provided a method of separating solid particles from a liquid comprising feeding the liquid and solid particle mixture tangentially at sufficiently high velocity into the wide end of a tapered tube to cause the mixture to rotate and form a vortex, removing some of the solid particles from the narrow end of the tube, passing the liquid and remaining solid particles out of the tube through a cylindrical vortex finder coaxial with the tube at the wide end thereof into a housing containing a tubular filter mounted coaxially with and at the wide end of the tube, passing liquid and remaining solid particles through the filter, the remaining solid particles being trapped by the filter and thus being removed from the liquid, characterised in that some liquid and remaining solid particles which enters the housing is passed axially and rotationally across the surface of the filter to detach solid matter.

Preferably said some liquid and remaining solid particles is passed continuously axially and rotationally across the surface of the filter to detach solid matter. Said liquid and remaining solid particles which is passed through the filter the remaining solid particles being trapped by the trapped by the filter, and thus removed from the liquid, may be passed through either inwardly or outwardly.

Preferably the tubular filter is backwashed to remove said solid particles trapped thereby. Some fluid from which solid particles has been removed may be stored in an accumulator and then passed back through the filter to remove solid particles trapped therein.

BRIEF DESCRIPTION OF DRAWINGS

Two embodiments of the invention will now be described by way of example only with reference to the accompanying drawings of which.

DETAILED DISCUSSION OF PREFERRED EMBODIMENTS

Figure 1:
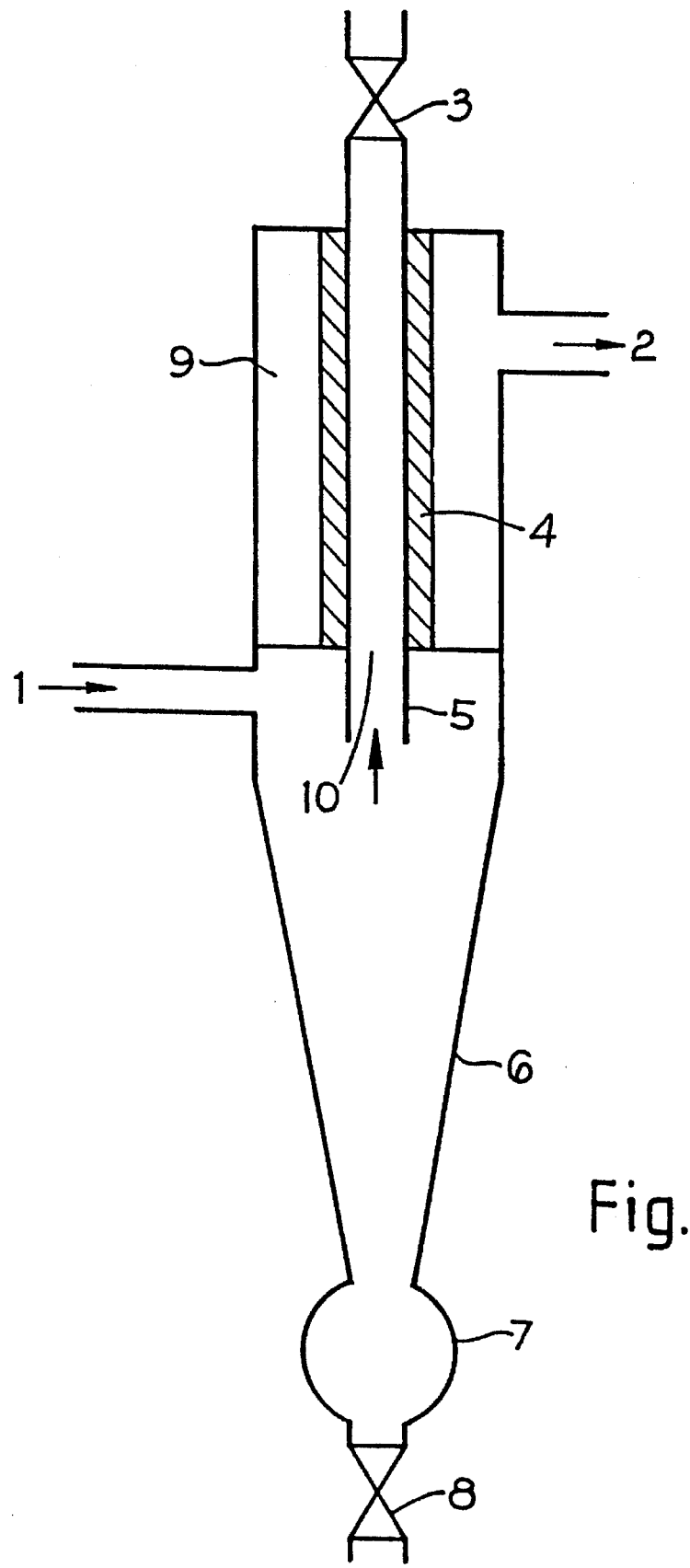
FIG. 1 shows a longitudinal cross-section through the separator in accordance with the first embodiment.

The separator illustrated diagrammatically in FIG. 1 comprises a tapered cyclone tube 6 into which water enters via an inlet 1 which has a tangential configuration so that a vortex is created. At the narrow end of the cyclone tube is a collection chamber 7 having an outlet valve 8.

On the axis of the tube and at the wide end is an outlet 10. Associated with the outlet 10 is a vortex finder in the form of an open cylindrical tube 5 which is an extension of a tubular filter 4 mounted on the wide end of the tube. The filter may comprise a perforated or slotted metal tube having openings typically 25–100 micron across, or felt, fabric or polymeric material. The filter is surrounded by a cylindrical chamber 9 having an outlet 2 for cleaned water. The end of the tubular filter 4 is provided with a valve 3 which enables the filter to be backwashed or continually flushed by allowing a small flow from valve 3.

In operation water containing suspended solid particles to be separated enters through the tangential inlet 1. A vortex is generated within the tapered tube 6 causing dense solids such as sand particles to migrate under centrifugal force to the outer wall and hence travel down the outer wall into the collection chamber 7. Solid matter collected in this chamber may be discharged either continuously or periodically through the outlet valve 8.

Separated water i.e. less the denser solid particles but still containing some solid material such as small organic particles moves to the center of the vortex and migrates towards the wide end to exit via the outlet 10 through the vortex finder 5. It then enters the tubular filter 4 and moves outwards through the slots or perforations or other filter material, so that the smaller particles are removed, into the cylindrical chamber 9 and then out through the outlet 2. The cleaned water may then be used as required. The tubular filter may be cleaned by the periodic opening of the valve 3 (or continuously by having valve 3 partially open) thus causing some of the water flowing from the separator tube to pass across the filter element in a direction which is both axial ie vertical in the diagram, and rotationally as a result of the vortex flow created in the separator tube 6. Thus the interior surface of the filter element is placed under shearing forces which detach solid matter trapped in the filter element. Backwashing may also be accomplished by passing some of the cleaned water leaving via the outlet 2 back through the filter element on an intermittent basis.

In order to accomodate large flow rates of water to be cleaned banks of separators as illustrated maybe arranged in parallel within one or more larger pressure vessels.

Figure 2:
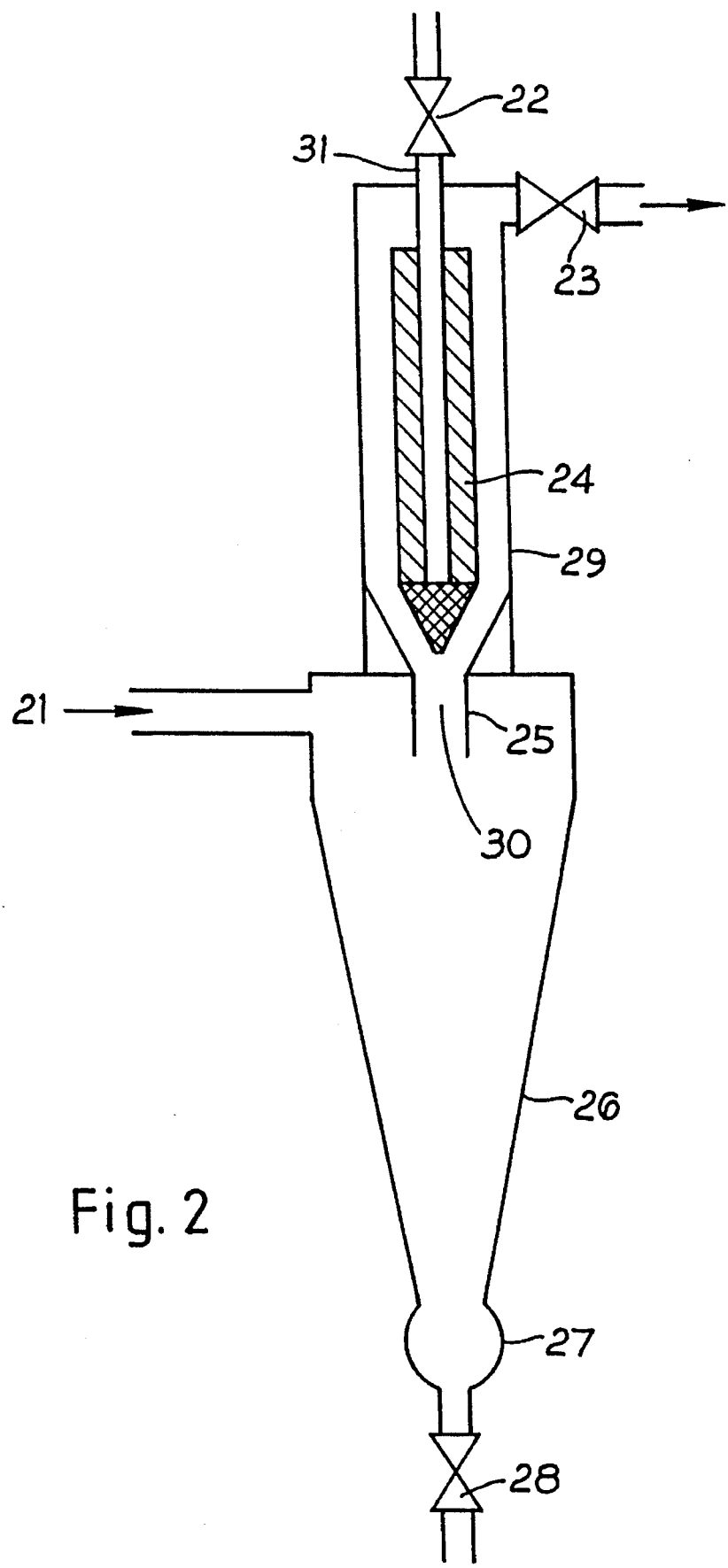
FIG. 2 shows a longitudinal cross-section through the separator in accordance with the second embodiment.

The separator illustrated diagrammatically in FIG. 2 comprises a tapered cyclone tube 26 into which water enters via an inlet 21 which has a tangential configuration so that a vortex is created. At the narrow end of the cyclone tube is a collection chamber 27 having an outlet valve 28.

On the axis of the cyclone tube and at the wide end is an outlet 30. Associated with the outlet is a vortex finder in the form of an open cylindrical tube 25 which is an extension of a cylindrical housing 29 for a tubular filter 24 mounted at the wide end of the tube 26. The tubular filter 24 is mounted coaxially within the housing 29 and with the tube 26. The filter may comprise a perforated or slotted metal tube having openings typically 25–100 micron across, or felt, fabric or polymeric material. The interior of the filter is connected to a tube 31 which passes out through the housing via a valve 22. The housing has an exit provided with a further valve 23 by means of which the filter may be backwashed.

In operation water containing suspended solid particles to be separated, enters through the tangential inlet 21 and is caused to spin thereby creating a vortex. This subjects the suspended particles to a centrifugal force causing them to migrate towards the outer wall of the cyclone tube 26 and travel down the outer wall into the collection chamber 27. Solid matter collected in this chamber may be discharged either continuously or periodically through the outlet valve 28.

Water which has undergone this primary stage of separation of suspended particles, but still containing some solid material such as fine or less dense articles e.g. small organic particles, moves towards the center of the vortex and, still spinning, migrates towards the wide end to exit via the outlet 30 through the vortex finder 25. Here it enters the tubular housing 29 and with valve 23 shut, passes through the filter in a radially inwards direction so that the smaller particles are removed and then out through the tube 31 and valve 22. The cleaned water may be used as required. The valve 23 may be opened as required for the continuous or periodic removal of that solid material which has migrated towards the housing wall. Backwashing may be accomplished by passing some of the cleaned water leaving via the valve 22 back through the filter 24 on an intermittent basis.

The advantage of this embodiment of the invention is that the filter has a longer life (between backwashes) due to the fact that there is a centrifugal force always trying to keep suspended particles away from the outer surface of the filter which is also being scoured i.e. subjected to a shearing force by the spinning liquid.

Figure 3:
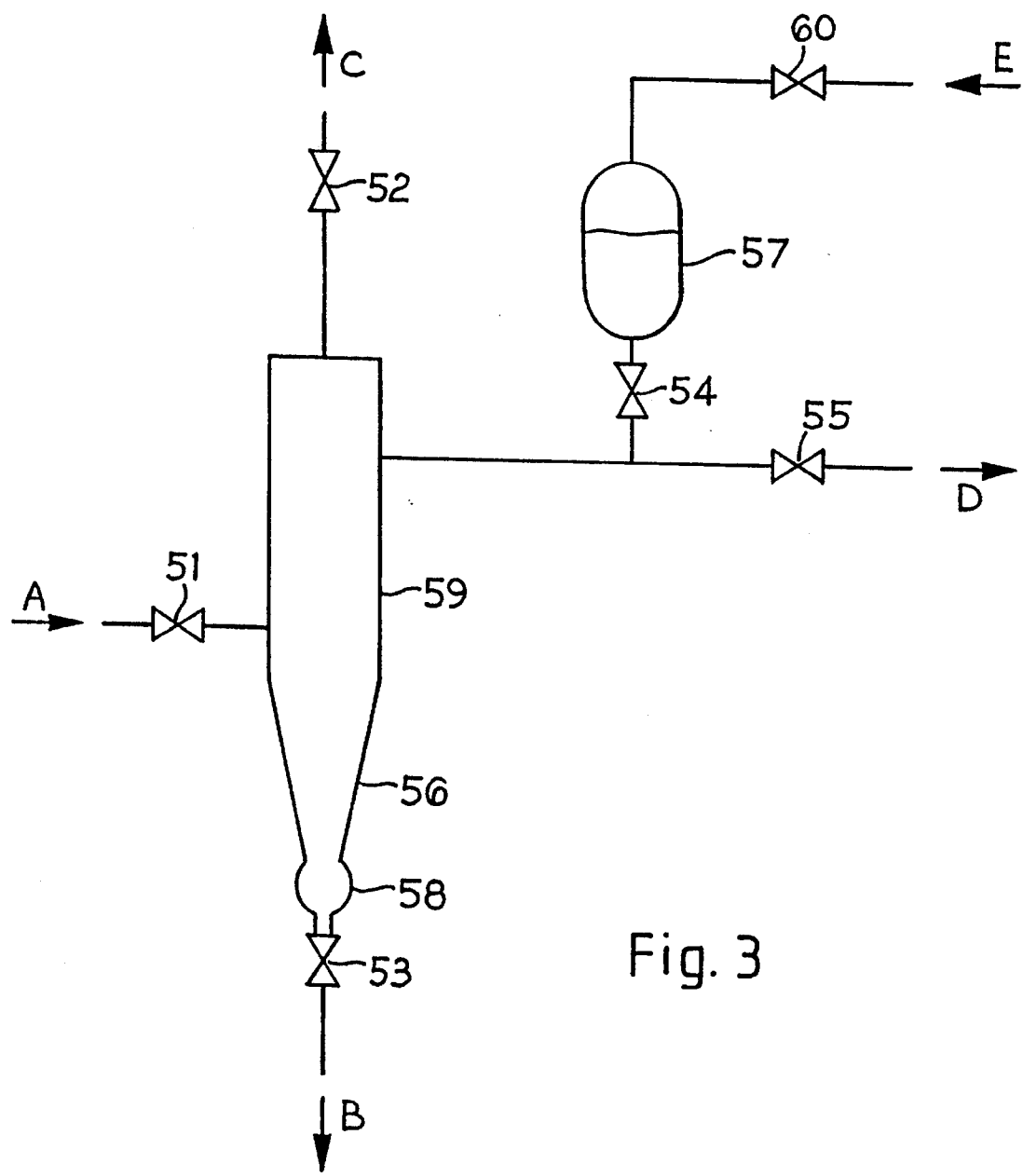
FIG. 3 shows a system in which either embodiment may be incorporated.

Either embodiment of the invention may be incorporated into the system illustrated in FIG. 3. As shown the separator comprises a cyclone tube 56 and a filter housing 59. Water containing suspended solid particles to be separated enters the separator at inlet A via valve 51. Under normal operation valve 51 is open. Larger, more dense solid material collects in chamber 58 at the narrow end of the cyclone tube and may be removed continuously or intermittently through outlet B via valve 53. Treated liquid exits from the separator at outlet D via valve 55 which is normally open.

Outlet C and associated valve 52 are provided so that a small amount of liquid which has not passed through but scoured the filter may be discharged continuously or intermittently as required.

An accumulator 57 is connected by means of a valve 54 to the outlet D between the separator housing 59 and the valve 55. The valve 54 is normally closed. The accumulator 57 may be pressurised, typically using an inert gas but other fluids may be used, via inlet E and associated valve 60.

Under normal operation valves 51, 53 and 55 are open so that water (or other liquid) containing suspended solid particles enter the separator through inlet A; larger, more dense solid particles are removed continuously through outlet B; and cleaned water is removed through outlet D. Valve 52 may be opened or closed depending on whether the cross-flow scouring of the filter is required.

If valve 54 is opened for a short time the accumulator is filled with treated water and this may be used to provide a "pulsed" backwash by one of the following procedures:
a) With valve 52 open, open valve 54 until the contents of the accumulator 57 are discharged, (this step being part of an automated sequence).
b) With valve 52 open, close valve 55 and open valve 54 until the contents of the accumulator 57 are discharged. Then close valve 54 and re-open valve 55.
c) With valve 52 open close valves 51, 53 and 55. Open valve 54 periodically before putting the system back on-line with valves 51, 53 and 55 open, and with valve 52 also open if using the cross-flow scouring facility.

I claim:
1. A separator for separating solid particles from a liquid comprising a tapered tube having a wide and a narrow end, a tangential inlet at the wide end of the tube for feeding the liquid and particle mixture tangentially into the tube at sufficiently high velocity to cause the mixture to rotate and thereby form a vortex, an outlet at the narrow end of the tube for the removal of at least some of the solid particles, an outlet at the wide end of the tube for the removal of the liquid and the remaining solid particles, a housing having a tubular filter located therein, a first exit and a second exit, the filter being mounted coaxially with the tube at the wide end thereof, the outlet at the wide end of the tube comprising a cylindrical vortex finder provided coaxially with the tube for guiding liquid and the remaining solid particles from the tapered tube to the tubular filter, the first exit positioned to allow liquid which has passed through and been filtered by the filter to pass out of the housing, wherein the housing second exit includes a further outlet for causing some liquid and remaining solid particles to pass axially and rotationally across the surface of the filter to detach trapped solid matter and then out of the housing through said second exit.

2. A separator according to claim 1 wherein the second exit is operable to be opened or closed as required.

3. A separator according to claim 1 wherein the second exit is operated to be continuously opened.

4. A separator according to claim 1 wherein the vortex finder is constructed and arranged to guide said liquid and remaining solid particles to the interior of the tubular filter, liquid then passing outwards through the filter to remove remaining solid particles therefrom.

5. A separator according to claim 1 where the vortex finder is constructed and arranged to guide said liquid and remaining solid particles to the exterior of the tubular filter, liquid then passing inwards through the filter to remove remaining solid particles therefrom.

6. A separator according to claim 1 wherein a chamber is provided at the narrow end of the tube for collecting solid particles.

7. A separator according to claim 1 wherein backwash means is operatively connected to the tubular filer to remove solid particles trapped thereby.

8. A separator according to claim 7, wherein the backwash means comprises an accumulator in which some liquid, from which solid particles have been removed, may be stored and then passed back through the filter to remove solid particles trapped therein.

9. A method of separating solid particles from a liquid comprising feeding the liquid and solid particle mixture tangentially at sufficiently high velocity into a wide end of a tapered tube having said wide end and a narrow end to cause the mixture to rotate and form a vortex, removing some of the solid particles from the narrow end of the tube, passing the liquid and remaining solid particles out of the tube through a cylindrical vortex finder coaxial with the tube at the wide end thereof into a housing containing a tubular filter mounted coaxially with and at the wide end of the tube, passing liquid and remaining solid particles to the filter, the liquid passing through the filter and the remaining solid particles being trapped by the filter and thus being removed from the liquid, wherein some liquid and remaining solid particles which enter the housing are passed axially and rotationally across the surface of the filter to detach solid matter.

10. A method according to claim 9 wherein said some liquid and remaining solid particles which enter the housing is passed continuously axially and rotationally across the surface of the filter to detach solid matter.

11. A method according to claim 10 wherein said liquid and remaining solid particles is passed to the tubular filter, the liquid being passed from inside to outside said tubular filter, the remaining solid particles being trapped by the filter and thus being removed from the liquid.

12. A method according to claim 10 wherein said liquid and remaining solid particles are passed to the tubular filter, the liquid being passed from outside to inside said tubular filter, the remaining solid particles being trapped by the filter and thus being removed from the liquid.

13. A method according to claim 10 wherein solid particles are collected in a chamber at the narrow end of the tapered tube.

14. A method according to claim 10 wherein the tubular filter is backwashed to remove solid particles trapped thereby.

15. A method according to claim 10 wherein some liquid from which solid particles have been removed by the filter is stored in an accumulator and then passed back through the filter to remove solid particles trapped therein.

* * * * *